Patented Apr. 8, 1941

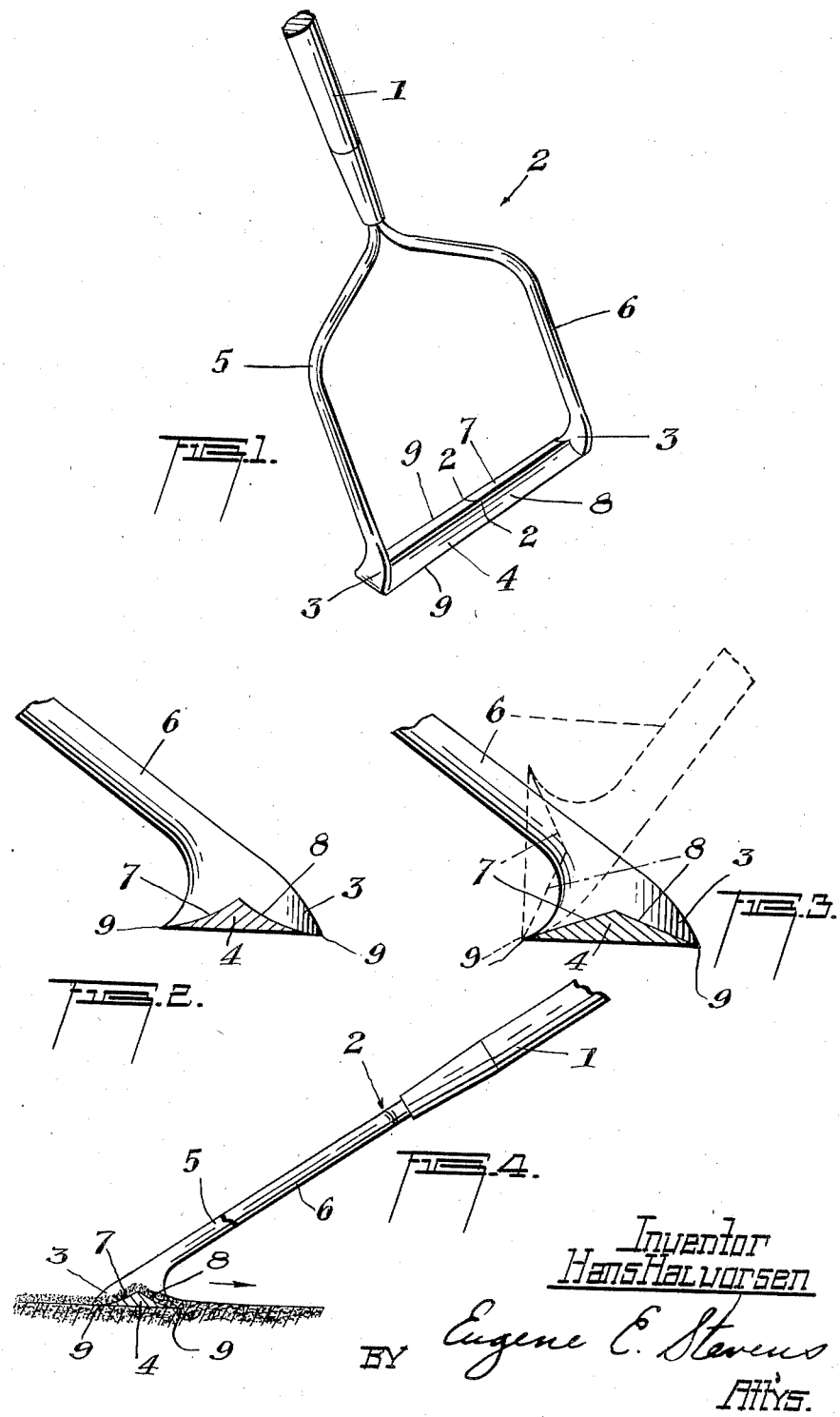

2,237,988

UNITED STATES PATENT OFFICE 2,237,988

GARDEN TOOL

Hans Halvorsen, Alsask, Saskatchewan, Canada, assignor of one-half to Oscar Halvorsen, Alsask, Saskatchewan, Canada Application February 20, 1939, Serial No. 257,505

1 Claim. (Cl. 97—68)

This invention relates to a garden tool which is reversible, may be used for cultivating or hoeing, and may be operated by pulling or pushing strokes. The tool according to the invention comprises a handle, a frame of substantial length and breadth secured to one end of the handle and a blade secured in the side of the frame opposite the end of the handle and extending substantially the full width of this side, characterized by the fact that the blade is fixed at an angle to the plane of the frame substantially different from a right angle.

A hoeing tool in which the blade is held at the side opposite the end of the handle in a large frame has previously been proposed. In it, however, the blade is set at right angles to the frame. It therefore cannot be used for cultivation at all and has none of the flexibility of the tool of this invention. It is in fact little better than an ordinary hoe except that the sides of the frame form a guard for plants against the blade.

A tool having a blade the angularity of which is adjustable has also been proposed. The adjustment of angularity is, however, quite unnecessary and the arrangement proposed to permit it is so cumbersome that it offsets all the advantages which arise from having the blade at an angle to the plane of the frame. The blade is held on arms the far ends of which are pivoted to a bar forming the side of the frame opposite the handle end, so that when the blade is set at an angle it is out of the plane of the rest of the tool and cannot approach closely to any plant over which the frame has been slipped.

In the drawing of the invention:

Figure 1 is a perspective view of the tool with the handle broken away.

Figure 2 is an enlarged cross sectional view on the line 2—2 of Figure 1.

Figure 3 is an enlarged cross sectional view of an alternative form of blade, and Figure 4 is a view showing a manner of use of the tool for cultivating purposes.

The tool has a handle 1, to one end of which is secured a frame 2 of substantial length and breadth, its dimensions being so chosen that it may be slipped over plants to be cultivated, with the result that the blade may be brought up close to their roots without their stems or foliage being damaged. The frame is preferably substantially rectangular as shown, since this form allows the greatest freedom of movement of the tool when it is placed over the plants.

In the side 3 of the frame opposite the end of the handle 1 is secured a blade 4. This blade may form one piece of metal with the rest of the frame, the two ends of the piece being held in the end of the handle 1, or it may be of different metal from the rest of the frame and connected to the outer ends of the two sides 5 and 6 of the latter in any suitable way. Instead of being at right angles to the plane of the frame, it is fixed at an angle to this plane substantially different from a right angle. It has been found that this angle should for greatest ease of manipulation of the tool be between about 30° and 40° and it is preferably approximately 35°. The blade is of substantially triangular cross section, its upper faces 7 and 8 being preferably slightly concave as shown in Figure 2, though they may be straight as shown in Figure 3. It is sharpened as at 9 along both edges so that it has two cutting edges.

The advantages of the construction described are numerous. The tool may be worked very close to delicate plants which spread out close to the ground without injuring them, since the frame may be chosen of a width greater than the diameter of the plant and the blade is so low that it can get under the plant where it has spread out. The frame, as in the prior construction described, serves as a guide to prevent accidental cutting of the plants between which weeding is being done, as so often happens with a hoe. The tool may be used for cultivation in approximately the position illustrated in Figure 4 and when it is used for this purpose long strokes may be taken with it, rather than the short strokes which generally must be taken with the ordinary cultivating tool. As it is worked back and forth the soil is lifted up by the inclined leading face of the blade (8 in Figure 4), dropped over the ridge and broken up on the trailing face (7 in Figure 4). Thus the tool not only cuts the weeds but also breaks up the surface of the soil leaving it in a fine mulch, so that moisture is conserved for the plants. As the lower face of the blade runs substantially parallel to the level of the ground when the tool is used as shown in Figure 4, the earth is not moved from one place to another as it is apt to be by a hoe and the ground after cultivation is left smooth. The tool is thus more easily manipulated and gives more even cultivation than other tools, with which one is very apt to cultivate more deeply at one point than at the next. Moreover, when weeds adhere to it, it may be freed of these simply by pushing it a short distance in the opposite direction, i. e. to the left in Figure 4. It is well known that almost any other cultivating tool must be freed of weeds manually.

The tool may be reversed so that its blade occupies the position shown in dotted lines in Figure 3 with the handle still at the angle shown. When so reversed, it can be used with either a pushing or pulling stroke for hilling. It is thus capable of performing, in one position or the other, all the functions of a hoe, and performing most of them better, besides providing the opportunity for a change of effort on the part of the user.

I claim:

A garden tool comprising a handle, a frame of substantial length and breadth secured to one end of the handle and a blade of substantially triangular cross section secured in the side of the frame opposite the end of the handle and extending substantially the full width of such side, characterized by the fact that the blade is fixed at an angle of between about 30° to 40° to the plane of the frame and the upper faces of the blade are slightly concave.

HANS HALVORSEN.